(12) United States Patent
Padfield et al.

(10) Patent No.: US 9,376,011 B1
(45) Date of Patent: Jun. 28, 2016

(54) METHODS FOR TRANSFERRING VOLATILE LIQUIDS BETWEEN RAILROAD CARS AND TRUCKS

(76) Inventors: Larry Padfield, Spring, TX (US); Tom Hansen, Arlington, TX (US)

(*) Notice: Subject to any disclaimer, the term of this patent is extended or adjusted under 35 U.S.C. 154(b) by 1151 days.

(21) Appl. No.: 13/032,920

(22) Filed: Feb. 23, 2011

Related U.S. Application Data

(60) Provisional application No. 61/289,253, filed on Mar. 3, 2010.

(51) Int. Cl.
  *B65B 31/00* (2006.01)
  *B60K 15/04* (2006.01)
  *B60K 15/035* (2006.01)

(52) U.S. Cl.
  CPC ....... *B60K 15/04* (2013.01); *B60K 2015/03585* (2013.01)

(58) Field of Classification Search
  CPC ................ B67D 7/54; B67D 7/0478; B60K 2015/03296; B60K 2015/03585
  USPC ........................................ 141/7, 59, 110, 286
  See application file for complete search history.

(56) References Cited

U.S. PATENT DOCUMENTS

| | | | | | |
|---|---|---|---|---|---|
| 4,058,147 | A | * | 11/1977 | Stary et al. | 141/45 |
| 5,038,838 | A | * | 8/1991 | Bergamini | B67D 7/0476 |
| | | | | | 137/587 |
| 5,878,767 | A | * | 3/1999 | Etling et al. | 137/15.01 |
| 6,240,982 | B1 | * | 6/2001 | Bonne | 141/59 |
| 7,270,155 | B2 | * | 9/2007 | Ho | 141/59 |
| 8,376,000 | B2 | * | 2/2013 | Gray et al. | 141/95 |
| 8,381,775 | B2 | * | 2/2013 | Healy | 141/4 |

* cited by examiner

*Primary Examiner* — Jason K Niesz
(74) *Attorney, Agent, or Firm* — The Elliott Law Firm; Douglas H. Elliott; Sarah J. Kelly

(57) ABSTRACT

A method of transferring a volatile organic liquid between a railcar and a truck, comprising: providing for the flow of a volatile organic liquid through a first conduit from a liquid unloading vessel to a liquid loading vessel, wherein the liquid unloading vessel can be coupled to or part of a railcar, in which case the liquid loading vessel is coupled to or part of a truck, or the liquid unloading vessel can be coupled to or part of the truck, in which case the liquid loading vessel is coupled to or part of the railcar; providing for the flow of organic vapor through a second conduit from the liquid loading vessel to the liquid unloading vessel; and providing for the flow of organic vapor from the second conduit through a pressure relief valve upon opening of the pressure relief valve.

2 Claims, 5 Drawing Sheets

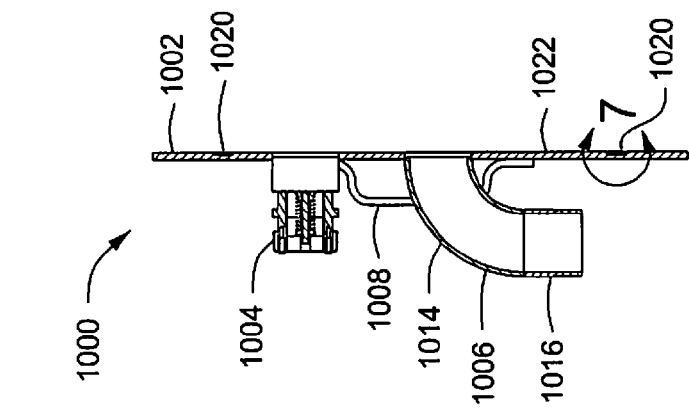
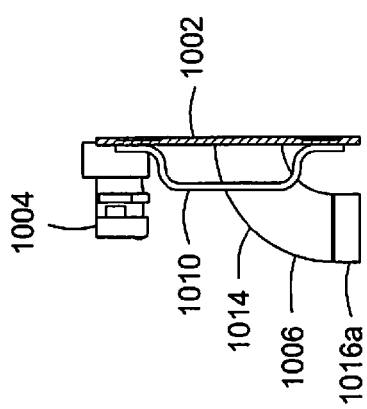
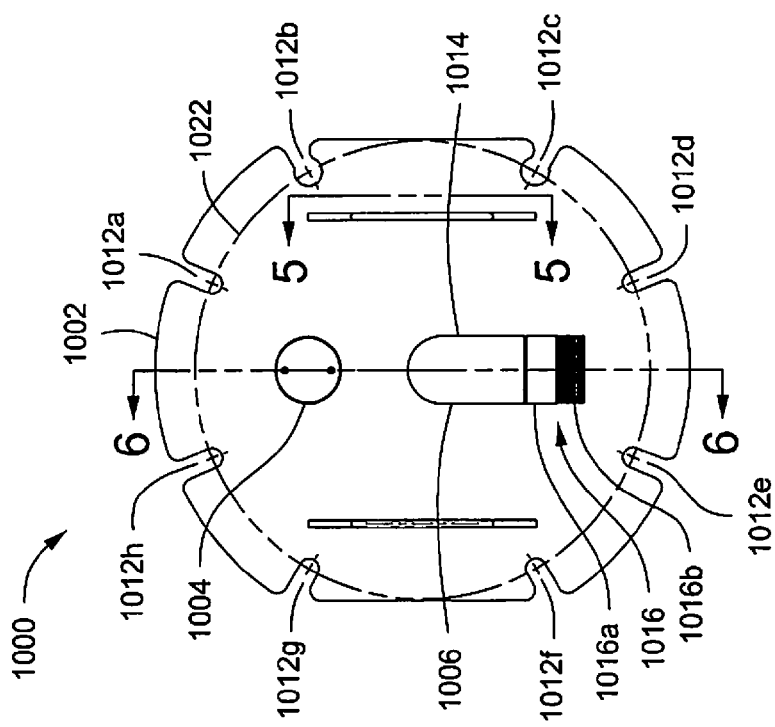

US 9,376,011 B1

METHODS FOR TRANSFERRING VOLATILE LIQUIDS BETWEEN RAILROAD CARS AND TRUCKS

CROSS-REFERENCE TO RELATED APPLICATIONS

This application claims benefit of U.S. provisional patent application Ser. No. 61/289,253, filed Mar. 3, 2010, which is herein incorporated by reference.

FIELD OF INVENTIONS

This patent specification is directed to transferring a volatile liquid between a railcar and a truck, while controlling vapor emissions.

BACKGROUND OF THE INVENTION

In the past, a variety of methods and systems have been used to transfer volatile liquids (e.g., ethanol) from railroad cars ("rail tank cars") to transport trucks. During the transferring of the liquids from the railcars to the trucks (referred to herein at times as "liquid transfer"), certain amounts of the liquids tend to vaporize, e.g., after the liquids enter the tanks located on the trucks. Those vapors can be recovered and piped back to the railcars, so that the vapors are recovered and not released to the atmosphere.

SUMMARY OF THE INVENTION

The present invention generally relates to systems and methods for transferring a volatile liquid. In one embodiment, a system is disclosed for transferring a volatile organic liquid between a railcar and a truck, comprising: a liquid conduit capable of providing for flow of a volatile organic liquid through the liquid conduit, from a liquid unloading vessel to a liquid loading vessel; a vapor conduit capable of providing for flow of an organic vapor through the vapor conduit, from the liquid loading vessel to the liquid unloading vessel, wherein the organic vapor is a volatilized form of the volatile organic liquid, and wherein the liquid unloading vessel can be coupled to or part of a railcar, in which case the liquid loading vessel is coupled to or part of the truck, or the liquid unloading vessel can be coupled to or part of the truck, in which case the liquid loading vessel is coupled to or part of the railcar; a liquid unloading connection, coupled to the liquid conduit, capable of being coupled to the liquid unloading vessel; a liquid loading connection, coupled to liquid conduit, capable of being coupled to the liquid loading vessel; a vapor loading connection, coupled to the vapor conduit, capable of being coupled to the liquid loading vessel; a vapor unloading connection, coupled to the vapor conduit, capable of being coupled to the liquid unloading vessel; at least one pressure relief valve capable of being in fluid communication with the vapor conduit, and having a pressure relief valve inlet and a pressure relief valve outlet, the pressure relief valve inlet capable of receiving the organic vapor, the pressure relief valve outlet capable of discharging the organic vapor; and at least one adsorption bed that is capable of receiving organic vapor discharged from the pressure relief valve outlet; and adsorbing at least a portion of the received organic vapor.

In another embodiment a system is disclosed for transferring a volatile organic liquid between a railcar and a truck, comprising: a liquid conduit capable of receiving organic liquid from a railcar and delivering it to a truck; a vapor conduit capable of receiving organic vapor from the truck and delivering it to the railcar; and a pressure relief valve capable of receiving vapor from the vapor conduit.

In a further embodiment, a method is disclosed of transferring a volatile organic liquid between a railcar and a truck, comprising: providing for the flow of a volatile organic liquid through a first conduit from a liquid unloading vessel to a liquid loading vessel, wherein the liquid unloading vessel can be coupled to or part of a railcar, in which case the liquid loading vessel is coupled to or part of a truck, or the liquid unloading vessel can be coupled to or part of the truck, in which case the liquid loading vessel is coupled to or part of the railcar; providing for the flow of organic vapor through a second conduit from the liquid loading vessel to the liquid unloading vessel; and providing for the flow of organic vapor from the second conduit through a pressure relief valve upon opening of the pressure relief valve.

In one embodiment a method is disclosed of transferring a volatile organic liquid between a railcar and a truck, comprising: providing a liquid unloading vessel having a volatile organic liquid to a volatile liquid unloading facility, wherein the liquid unloading facility has at least a first conduit, a second conduit, a pressure relief valve in fluid communication with the second conduit, and a first adsorption bed in fluid communication with the pressure relief valve; providing flow of volatile organic liquid from the liquid unloading vessel to the liquid unloading facility, wherein volatile organic liquid flows through the first conduit to a liquid loading vessel, and wherein the liquid unloading vessel can be coupled to or part of a railcar, in which case the liquid loading vessel is coupled to or part of a truck, or the liquid unloading vessel can be coupled to or part of the truck, in which case the liquid loading vessel is coupled to or part of the railcar; and providing flow of organic vapor into the liquid unloading vessel, wherein organic vapor flows from the liquid loading vessel, through the second conduit, and into the liquid unloading vessel, and wherein the pressure relief valve is capable of opening such that organic vapor in the second conduit may pass through the pressure relief valve and flow to the adsorption bed.

In another embodiment, a method is disclosed of transferring a volatile organic liquid between a railcar and a truck, comprising: providing a liquid loading vessel for receiving a volatile organic liquid from a volatile organic liquid unloading facility, wherein the liquid unloading facility may be coupled to a liquid unloading vessel that can be coupled to or part of a railcar, in which case the liquid loading vessel is coupled to or part of a truck, or the liquid unloading vessel can be coupled to or part of the truck, in which case the liquid loading vessel is coupled to or part of the railcar, and wherein the volatile liquid unloading facility has at least a first conduit, a second conduit, a pressure relief valve in fluid communication with the second conduit, and a first adsorption bed in fluid communication with the pressure relief valve; providing flow of volatile organic liquid to enter the liquid loading vessel from the liquid unloading facility, wherein volatile organic liquid flows from the liquid unloading vessel, through the first conduit, and into the liquid loading vessel; providing flow of organic vapor from the liquid loading vessel to the liquid unloading facility, wherein organic vapor flows from the liquid loading vessel, through the second conduit, and into the liquid unloading vessel, and wherein the pressure relief valve is capable of opening such that organic vapor in the second conduit may pass through the pressure relief valve and flow to the adsorption bed.

BRIEF DESCRIPTION OF THE DRAWINGS

FIG. 4 is a schematic illustration of a top view of a manway cover.

FIG. 5 is a schematic illustration of a side view of a portion of a manway cover.

FIG. 6 is a schematic illustration of a side view of a manway cover.

DETAILED DESCRIPTION

Introduction and Definitions

Figure 1:
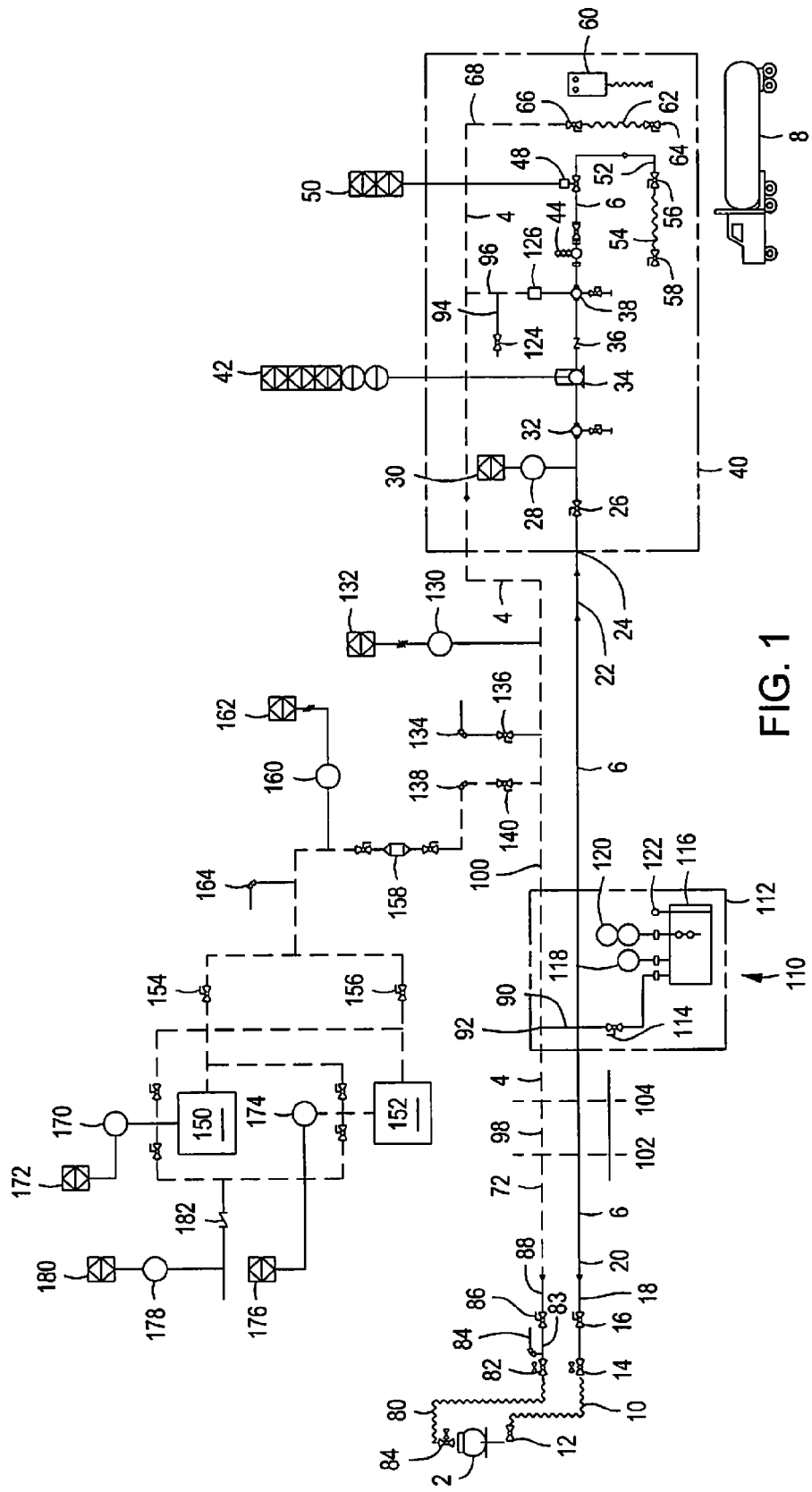
FIG. 1 is a schematic illustration of a vapor control system with an overpressure adsorption capability.

A detailed description will now be provided. The purpose of this detailed description, which includes the drawings, is to satisfy the statutory requirements of 35 U.S.C. §112. For example, the detailed description includes disclosure of the inventors' best mode of practicing the inventions, a description of the inventions, and sufficient information that would enable a person having ordinary skill in the art to make and use the inventions referenced in the claims.

Each of the appended claims defines a separate invention, which for infringement purposes is recognized as including equivalents of the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology. Various terms as used herein are defined below, and those definitions should be adopted when construing the claims that include those terms, except to the extent a different meaning is given within the specification or in express representations to the Patent and Trademark Office (PTO). To the extent a term used in a claim is not defined below, or in representations to the PTO, it should be given the broadest definition persons in the pertinent art have given that term as reflected in printed publications, dictionaries and issued patents.

Certain claims include one or more of the following terms, which as used herein, are expressly defined as follows.

The term "pressure relief valve" is used herein to describe any device that is capable of opening, closing, or opening and closing a fluid pathway in response to pressure (or a condition related to pressure, such as temperature). For example, a pressure relief valve may be placed on a vessel or on piping as a safety precaution to prevent against overpressure in the vessel or piping. A pressure relief valve may be set to mechanically open when a certain pressure is reached, such as by mechanical tension or spring loading, thus providing a fluid pathway to relieve pressure. Pressure relief valves may open or close fully or partially, depending on preferences or configuration. A pressure relief valve may also be opened or closed to a desired extent by electronic controls or an operator, such as in response to pressure (whether measured or calculated) or an operating condition related to pressure (such as temperature, whether measured or calculated). Pressure relief may also be provided by other devices known in the art. As a further example, a rupture disc may be used, having a layer of material configured to rupture at a certain pressure, thereby opening a fluid pathway to relieve pressure. The term "pressure relief valve" as used herein is meant to encompass such devices.

The term "connecting," means any act of providing for a connection, including securing and coupling. The term "connection" means any structure or device that is capable of securing or coupling one structure to at least one other structure. A "connection" may be some intermediate structure that is separate and different from the structures being connected, although the connection can also be an integral part of one of the structures, e.g., a hose fitting. Other examples of connections are clamps or a series of bolts, or a flange or two flanges that are capable of being clamped together. It is to be understood that other structures may be used to connect or couple one object to another.

The term "in fluid communication" between two objects means that fluid (including but not limited to liquid or gas) is capable of flowing between the two objects. It is to be understood that other objects may be used to place the two objects in fluid communication.

Certain Specific Embodiments

One of the objectives of the embodiments described herein is to reduce the amount of vapor released to the atmosphere during liquid transfer. Accordingly, one or more methods, systems and/or apparatus are described below for transferring volatile liquids between a truck and a railcar in which release of vapors is controlled. With certain specific embodiments of the system, methods and apparatus described herein, the amount of vapor that is released to the environment (the surrounding atmosphere outside the liquid transfer system and the vapor control system) during the transferring or volatile liquids between trucks and railcars is zero, or substantially zero, e.g., a measurement less than a detectable limit of a given measurement technique or device, or a measurement whose significant digits are less than a predetermined level or less than a prescribed "zero limit" level.

Also disclosed herein are systems for transferring a volatile organic liquid between a railcar and a truck, comprising: a liquid conduit capable of receiving organic liquid from a railcar and delivering it to a truck; a vapor conduit capable of receiving organic vapor from the truck and delivering it to the railcar; and a pressure relief valve capable of receiving vapor from the vapor conduit.

One or more of the systems further comprise an adsorption bed capable of receiving vapor from the pressure relief valve. Some systems also comprise a second adsorption bed capable of receiving vapor from the pressure relief valve. In some embodiments, the second adsorption bed is arranged in parallel with the first adsorption bed. One or more of the systems further comprise at least one valve that provides for altering which of the adsorption beds are in fluid communication with the pressure relief valve. In additional embodiments, either at least one of the adsorption beds or an adsorption media in at least one of the beds is capable of being replaced during operation of the system. In further embodiments, at least one of the adsorption beds comprises activated carbon.

In one or more of the systems, the pressure relief valve is set to open at a specific pressure or pressure range. In some embodiments, the pressure relief valve is set to open at a pressure of about 1 psi. In other embodiments, the pressure relief valve is set to open at a pressure of about 0.75 psi. Other embodiments further comprise a detonation arrestor positioned downstream of the pressure relief valve and upstream of the first adsorption bed. Additional embodiments further comprise a vacuum relief valve positioned downstream of the detonation arrestor and upstream of the first adsorption bed. Further embodiments comprise a temperature transducer in fluid communication with the detonation arrestor, and an alarm coupled to the temperature transducer.

In one or more of the systems, a first adsorption bed is capable of receiving vapor from the pressure relief valve, and at least a first vapor measurement device is suitable for determining when the first adsorption bed may need replacement. In some embodiments, the first vapor measurement device comprises a hydrocarbon analyzer capable of measuring hydrocarbons. In further embodiments, the hydrocarbon analyzer is positioned downstream of the adsorption bed. In other embodiments, the first vapor measurement device comprises a flow meter to measure an amount of vapor that passes through the pressure relief valve. In additional embodiments, the first vapor measurement device is suitable for verifying that the system operates within a zero emissions limit.

In one or more of the systems, an alarm capable of warning when the pressure relief valve opens. In some embodiments, a hydrocarbon analyzer is capable of measuring hydrocarbons in fluid communication with an outlet of the pressure relief valve. Additional embodiments further comprise an alarm capable of providing a warning based on an operating condition in the vapor conduit. Some embodiments further comprise a pressure transducer in fluid communication with the vapor conduit, and an alarm coupled to the pressure transducer.

In one or more of the systems, a liquid unloading connection is coupled to the liquid conduit, capable of being coupled to the railcar; a liquid loading connection is coupled to liquid conduit, capable of being coupled to the truck; a vapor loading connection is coupled to the vapor conduit, capable of being coupled to the truck; and a vapor unloading connection is coupled to the vapor conduit, capable of being coupled to the railcar. In some embodiments, an air release head is capable of providing a pathway for vapor in the liquid conduit to enter the vapor conduit. Additional embodiments further comprise a first dry-break connection for coupling the liquid unloading connection to the railcar, and a second dry-break connection for coupling the vapor unloading connection to the railcar.

In one or more of the systems, the system prevents environmental emissions of organic vapor. In some embodiments, at least a portion of the vapor conduit is positioned to slope down to a first low point. Further embodiments also comprise a first low point drain coupled to the first low point capable of draining a condensate from the first low point. Additional embodiments comprise a condensate collection vessel coupled to at least the first low point drain, wherein the condensate collection vessel has a level indicator. Other embodiments comprise an air release head capable of providing a pathway for any vapor formed in the liquid conduit to enter the vapor conduit. Further embodiments may also comprise a second low point positioned proximate to the air release head and a second low point drain coupled to the second low point.

In one or more of the systems, the liquid conduit is capable of receiving liquid from more than one railcar. In some embodiments, the liquid conduit is capable of delivering liquid to more than one truck. In additional embodiments, the vapor conduit is capable of receiving vapor from more than one truck. One or more systems further comprise a plurality of liquid receiving stations, wherein each liquid receiving station is coupled to the liquid conduit and each liquid receiving station system is capable of receiving liquid from a railcar. In further embodiments, each liquid receiving station is capable of receiving liquid from more than one railcar.

In one or more of the systems, a cover lid is coupled to a port in the railcar, wherein the cover lid is capable of receiving organic vapor. Some embodiments further comprise a vacuum breaker coupled to the cover lid.

Also disclosed herein are methods for transferring a volatile organic liquid between a railcar and a truck, comprising: providing for the flow of a volatile organic liquid through a first conduit from a liquid unloading vessel to a liquid loading vessel, wherein the liquid unloading vessel can be coupled to or part of a railcar, in which case the liquid loading vessel is coupled to or part of a truck, or the liquid unloading vessel can be coupled to or part of the truck, in which case the liquid loading vessel is coupled to or part of the railcar; providing for the flow of organic vapor through a second conduit from the liquid loading vessel to the liquid unloading vessel; and providing for the flow of organic vapor from the second conduit through a pressure relief valve upon opening of the pressure relief valve.

In one or more of the methods, the method further comprises providing for the flow of organic vapor from the pressure relief valve to an adsorption bed. Some embodiments further comprise preventing environmental emissions of organic vapor. In additional embodiments, a second adsorption bed is capable of receiving vapor from the pressure relief valve. In further embodiments, the second adsorption bed is arranged in parallel with the first adsorption bed. Still further embodiments comprise altering which of the adsorption beds receives organic vapor from the pressure relief valve. Another embodiments comprises replacing either at least one of the adsorption beds or an adsorption media in at least one of the beds during operation.

In one or more of the methods, the pressure relief valve is set to open at a selected pressure. In some embodiments, the pressure relief valve is set to open at a pressure selected from a range of about 1 psi or less. Other embodiments further comprise providing for the flow of organic vapor from the pressure relief valve to a detonation arrestor upstream of the adsorption bed. Further embodiments comprise measuring a temperature downstream of the detonation arrestor.

In one or more of the methods, the method also comprises providing for the flow of organic vapor from the pressure relief valve to an adsorption bed; and determining when the adsorption bed may need replacement. Some embodiments further comprise measuring hydrocarbons downstream of the adsorption bed. Additional embodiments further comprise measuring an amount of fluid that passes through the pressure relief valve. Further embodiments comprise verifying through measurement that a zero emissions limit is met.

In one or more of the methods, the method further comprises providing an alarm capable of warning when the pressure relief valve is open. Some embodiments further comprise providing an alarm capable of warning based on an operating condition in the second conduit. In additional embodiments, the operating condition in the second conduit is pressure.

In one or more of the methods, the method further comprises draining a condensate from a first low point drain coupled to the second conduit, wherein at least a portion of the second conduit is positioned to slope down to a first low point that is coupled to the first low point drain. Some embodiments further comprise collecting the condensate in a condensate collection vessel. Additional embodiments further comprise checking a level indicator coupled to the condensate collection vessel. Further embodiments comprise providing for flow of a vapor formed in the first conduit to the second conduit through an air release head coupled to the first conduit. Other embodiments further comprise draining condensate from a second low point drain, wherein the second low point drain is coupled to a second low point proximate to the air release head.

In one or more of the methods, the method further comprises providing for the flow of a volatile organic liquid through the first conduit from a second liquid unloading vessel, wherein the liquid unloading vessel and the second liquid unloading vessel are each railcars on a railroad track. In some embodiments, the method further comprises stopping the flow of the volatile organic liquid from the first liquid unloading vessel, and providing for the flow of a volatile organic liquid through the first conduit from a third liquid unloading vessel, wherein the third unloading vessel is a railcar. In additional embodiments, the method further comprises providing for the flow of organic vapor through the second conduit from a second liquid loading vessel, wherein the first and second liquid loading vessels are each trucks.

In one or more of the methods, the method further comprises providing a cover lid coupled to a port in the liquid unloading vessel, wherein the cover lid is capable of receiving organic vapor. In some embodiments, a vacuum breaker is coupled to the cover lid.

Specific Embodiments in Drawings

At least one example of a vapor control system 1 (apparatus) for transferring volatile liquids between trucks and railcars is shown in FIG. 1. Certain features, elements, hardware, configuration of that apparatus are shown in FIG. 1. For example, the system in FIG. 1 includes an ethanol unload feature, which includes various types and configurations of piping, valves, hoses and other conduits and components. The system in FIG. 1 also includes a vapor recovery feature, which includes other types and configurations of piping, valves, hoses and other conduits and components. In this embodiment, the vapor control system 1 may be used to unload a volatile liquid such as ethanol from a railcar 2 and load it into a truck 8, while controlling vapor emissions.

As illustrated in FIG. 1, the ethanol unload feature can include various piping and components to unload ethanol from a railcar 2 and to deliver ethanol to a truck 8. Ethanol liquid may be unloaded from railcar 2 by connecting a liquid unload hose 10 to a bottom portion of railcar 2 and to a liquid conduit 6. In this embodiment the liquid conduit 6 may comprise an ethanol header for ethanol transport. To prevent or reduce emissions or escape of liquid, dry break connectors 12 and 14 may be used to connect the liquid unload hose 10 to the railcar 2 and the liquid conduit 6, respectively. Other components may also be used to facilitate moving liquid from a hose to a liquid conduit with a larger diameter. For example, a sight glass (not shown) may assist in providing visual inspection of the liquid transfer. The liquid conduit 6 may further comprise a valve 16 followed by a medium width pipe section 18, which may be connected to a larger width pipe section 20. It is to be understood that other components like flanges and gaskets, pipe thread, other pipe pieces, or other connection devices or methods known in the art may be used to provide connections. The medium width pipe section pipe section 18 may be four inches in diameter, and the larger width pipe section 20 may be twelve inches in diameter. Pipe diameter may also be selected based on desired transport features, such as pressure, flow rate or velocity.

The liquid conduit 6 may be positioned at a downward slope so that the portion of the liquid conduit 6 near the railcar 2 may be at a higher elevation than the portion of the liquid conduit 6 near the truck 8. The slope may be steep, or gradual, or a combination. FIG. 1 provides an embodiment with a slope of about 0.25%. The sloping features may utilize gravity to prevent or reduce liquid from remaining in the liquid conduit 6, such as during a shutdown. The liquid conduit 6 may also comprise second and third medium width pipe sections 22 and 24, respectively. The second medium pipe section 22 may have a diameter of six inches, and the third medium width pipe section 24 may have a diameter of four inches. A valve 26 may also be provided. Additionally, various instruments may be used to measure one or more operating conditions in the liquid conduit 6. A measurement device 28 is shown downstream of the valve 26, and connected to an electronic output or control device 30. The measurement device 28 may comprise a flow meter. Additionally, a piping connection 32 may be provided, which may be used for a drain line.

A pump 34 may be provided to pump ethanol through the liquid conduit 6. Pump monitoring devices 42 may provide electronic output or control or alarms for the pump 34. The pump 34 may also be positioned on a pump skid 40. The pump skid 40 may also provide a convenient location for housing other components, such as illustrated in FIG. 1. The pump 34 may be rated for high capacity flow rates, such as 400 GPM (gallons per minute). Other components may be included with the pump or after the pump. FIG. 1 shows a check valve 36, a second piping connection 38, a counter and ticket printer 44, an electro-hydraulic set-stop valve 46 and an automatic motor operated valve 48 with associated outputs or controls 50. Afterwards, liquid ethanol may enter a pipe section 52 of smaller width, for example about three inches. A liquid loading hose 54 may then connected to the liquid conduit 6 or the pipe section 52. The liquid loading hose 54 may provide a connection to a liquid loading vessel housed on truck 8. The liquid loading hose 54 may be connected to truck 8 at a location suitable for receiving liquids, such as a bottom inlet/outlet or valve. Dry break connectors 56 and 58 connect the liquid loading hose 54 to the liquid conduit 6 and to the truck 8, respectively. An overspill protection system 60 may also be connected to the truck 8, to guard against overspill.

As liquid ethanol is transported through system 1, vapors may also be present. It is desirable to control these vapors, for example to recover vapors, to protect system equipment from overpressure or under-pressure, to reduce or avoid emissions to the atmosphere, or to improve safety. FIG. 1 also provides embodiments for a vapor balance system and a pressure protection system. As shown in FIG. 1, the vapor recovery feature can include a vapor balance system, which may include a collection of vapor level monitors, pressure transducers and temperature transducers, which are operated to maintain one or more operating conditions such as pressure in the piping and transport vehicles at a predetermined level or range, i.e., a level or range that is selected prior to the unloading of the volatile liquid. During the unloading of ethanol, vapors are fed back to the railcar 2 from the truck 8 through a vapor conduit 4. The vapor balance system may be configured to reduce or eliminate emissions to the atmosphere, whether during startup, operation or shutdown. The vapor balance system may also be configured to reduce the possibility of upsets, such as pressure upsets. The vapor balance system may also control condensate in any vapor lines, such as by providing for gravity draining or by controlling operating conditions to reduce or eliminate condensate.

In FIG. 1, vapors may be recovered from truck 8 by connecting a vapor loading hose 62 to a position on the loading vessel (in this case the truck 8) that is suitable for being in fluid communication with a vapor phase within the truck 8, such as at a top portion of the truck 8. The vapor loading hose 62 may be connected to the vapor conduit 4 for transportation to the railcar 2. Dry break connectors 64 and 66 may be provided to connect the vapor loading hose 62 to the truck 8 and the vapor conduit 70, respectively. The vapor conduit 4 may further comprise a first vapor conduit section 68 for receiving vapor from the truck 8. The first vapor conduit section 68 may comprise piping with about a three inch diameter. Portions of the first vapor conduit 68 may be provided at a slope so that condensate may drain from the pipe section. The Vapor conduit 4 may further comprise a second vapor conduit section 72 that connects to the first vapor conduit section 68. The second vapor conduit section 72 may comprise piping with about a six inch diameter. Portions of the second vapor conduit section 72 may be provided at a slope so that condensate may drain from the pipe section. Sloped conduits may provide for improved shutdown procedures or improved operations.

The second vapor conduit section 72 may be connected to the railcar 2 by providing a vapor loading hose 80, which connects to the loading vessel, in this case railcar 2. Dry break connectors 82 and 84 are provided to connect the vapor loading hose 80 to the railcar 2 and the vapor conduit 4, respectively. Other connection pieces may also be provided, including various conduit sections, piping, valves, flanges or other apparatus or methods known in the art. FIG. 1 illustrates an embodiment in which the dry break connector 82 may be connected to a conduit section 83 having a first vacuum relief valve 84, a valve 86, and a narrow conduit section 88. The narrow conduit section 88 may have about a two inch diameter, which may be connected to the larger second vapor conduit section 72. The first vacuum relief valve 84 may provide protection from under-pressure or vacuums by providing a flow path for air to enter the conduit section 83 if pressure drops too low.

The vapor balance system illustrated in FIG. 1 further comprises a first low point drain 90 in fluid communication with a first low point 92 in the second vapor conduit section 72, and a second low point drain 94 in fluid communication with a second low point 94 in the first vapor conduit section 68. Additional low point drains could be included, depending on the orientation of the conduits in the vapor control system 1, such as if additional low points are present. The vapor conduit 4 may be arranged so that there are two low point drains. The first low point 92 may be provided by one or more portions of the second vapor conduit section 72 being arranged at different elevations. For example, point 102 may be higher than point 104, so that gravity will drain condensate in a direction approximately opposite the direction of vapor flow. In FIG. 1, the second vapor conduit section 72 may comprise a first sloped portion 98 and a second sloped portion 100, sloped in opposite directions to provide the first low point in between. A slope of about 0.25% may be provided. Different conduit sections may also be sloped at various or selected gradients as appropriate. For example, a higher gradient may be desired for operations with higher flow rates, or for narrow conduit sections with higher vapor flow, or for more viscous liquids.

A condensate collection system 110 may also be provided. A condensate collection area 112 may be designated for housing the collection system 110. The condensate collection system 110 may also be sealed from the atmosphere. In FIG. 1, embodiments are shown in which the first low point drain comprises a piping section having a diameter of three inches. A valve 114 may be provided for opening or closing the drain. Valve 114 may be connected to a condensate collection vessel 116 having a level indicator 118. One or more measurement instruments 120 may also be provided, such as back up level indicators, alarms, or pressure or temperature measurement devices. The condensate collection vessel 116 may comprise a 55 gallon drum. Additionally, a hand operated pump 122 may be provided, so that the condensate collection vessel 116 may itself be emptied depending on readings from the level indicator 118 or other measurement instruments 120. In FIG. 1, the second low point drain 94 also has a valve 124 to open or close the drain. Depending on the configuration, the condensate collection vessel 116 may also be placed in fluid communication with the second low point drain 94. Alternatively, a second condensate vessel (not shown) could be utilized, or the condensate collection vessel 116 could be portable depending on the amount of condensate formed.

The vapor balance system may also be arranged to control vapor from the liquid conduit 6. Thus, vapor conduit 4 may be placed in fluid communication or connected with the liquid conduit 6 at appropriate points to receive vapor from the liquid conduit 6. FIG. 1 illustrates an embodiment in which an air release head 126 may be placed in fluid connection with a point in the liquid system downstream of pump 34. The air release head 126 provides a pathway for vapor in the liquid header to enter the vapor header. In FIG. 1, the air release head may be connected to the first vapor conduit section 68, and the second low point 96 may be positioned in proximity to the air release head.

In another embodiment, at least one measurement device 130 may be provided to monitor a condition in the vapor conduit 4. The measurement device 130 may be coupled to an alarm 132. Measurement device 130 may be used for pressure protection, and may comprise a pressure transducer. The pressure transducer may provide an alert if pressure is not within a desired range or not at a selected level. For example, if pressure becomes too high the measurement device 130 or the alarm 132 may alert an operator so that corrective action can be taken. Temperature transducers may also be used. Computers may also be used to make calculation or to analyze data, such as for deviations from normal conditions. Other vapor properties or composition may also be measured or other operating conditions such as flow rate. It is to be understood that monitoring may also be useful for startups and shutdowns as well as during operation. In a further embodiment, the vapor recovery feature includes a trigger mechanism, e.g., a pressure measurement device that measures the pressure level in the vapor piping. (In an alternative embodiment, some other property of the vapor is monitored, such as volume or composition.)

Pressure protection features may be provided to reduce or prevent emissions or to protect equipment or improve safety in the event of an upset in the vapor control system 1. Without pressure protection, if a vapor line becomes blocked, a leak could occur resulting in an emission. Referring to FIG. 1, a pressure relief valve 138 can be provided that is capable of opening, closing, or opening and closing a fluid pathway in response to a pressure. The pressure relief valve 138 may be set to open when a certain pressure is reached thus providing a fluid pathway from the vapor conduit 4 to relieve pressure. The pressure relieve valve 138 can be set at some predetermined level, e.g., about 1 psi or 0.75 psi for ethanol. The predetermined level may be based on the specific liquid that is being unloaded. The pressure relieve valve 138 may open mechanically upon reaching the necessary pressure, or alternatively may comprise a rupture disc. In another embodiment, the pressure relief valve 138 may comprise a control valve that is triggered to open to a desired extent based on a measurement from the measurement device 130. For example, a pressure transducer 130 may provide an alert when pressure in vapor conduit 4 reaches a certain level or comes within a certain range of a triggering pressure. When the triggering pressure is reached, pressure relief valve 138 may open to a desired extent. In another embodiment, a second vacuum relief valve 134 may be provided in fluid communication with the vapor conduit 4 in proximity to pressure relief valve 134. Valves 140 and 136 may also be provided to open or close fluid pathways to the pressure relief valve 138 or the vacuum relief valve, respectively. Valve features may allow an operator to select whether to use one or more available pressure protection systems.

In a further embodiment, vapor control system 1 also provides adsorption features to reduce or prevent vapor emissions. At least a first adsorption bed 150 may be provided to adsorb ethanol vapor that passes through pressure relieve valve 138. The first adsorption bed 150 may comprise an adsorption media that is capable of adsorbing a substance(s), such as ethanol vapor or other hydrocarbons, for example to capture the substance(s) or to prevent the substance(s) from being emitted to the atmosphere or sent entirely to a flare (which may result in other undesirable emissions). Activated carbon may be used as an adsorption material. The type of activated carbon used may also be selected based on desired properties, including but not limited to particle size, formation process, adsorption capabilities, reactivation potential, or chemical treatments such as impregnating with other substances that may benefit air quality. The size of the adsorption bed, including length, width, depth, diameter, or volume may also be selected based on its intended performance. For example, a larger bed size may provide more adsorption capacity. Diameter of the adsorption bed may also be selected to influence the flow rate of vapor through the bed. Commercially available activated carbon units may also be provided, such as a Siemens Vent-Scrub. Other adsorption materials are also known, such as molecular sieves and/or zeolites, which may be used for desired applications. For example, molecular sieves may be used as an adsorption material to adsorb particles of certain size ranges or features.

A second vapor adsorption bed 152 may also be provided. The second adsorption bed 152 may provide backup vapor control, either by being arranged in series or in parallel. The second adsorption bed 152 may also provide for increased adsorption capacity during operation, for example by running vapor flow to both the first and second adsorption beds 150 and 152, either arranged in series or in parallel. Additional adsorption bed(s) (not shown) could also be provided. FIG. 1 illustrates an arrangement where two vapor adsorption beds 150 and 152 are arranged in parallel. One embodiment may provide at least one valve that is capable of altering which of a plurality of adsorption beds are in fluid communication with the pressure relief valve 138. A plurality of valves may also be provided to direct flow or to create bypass lines. In FIG. 1, valve 154 is capable of opening or closing a flow path from the pressure relief valve 138 to the first vapor adsorber 150. Valve 156 is capable of opening or closing a flow path from the pressure relief valve 138 to the second vapor adsorber 152. In the embodiment shown, an operator may select between one or both of the vapor adsorption beds 150 and 152. The first adsorption bed 150 may be used as a primary bed, with the second adsorption bed 152 as a backup. The arrangement may also be reversed, whether during operation or shutdown. In a further embodiment, at least one of the adsorption beds or an adsorption media in at least one of the beds may be capable of being replaced during operation of the vapor control system 1.

Also, as shown in FIG. 1, other devices may be included, such as a detonation arrester 158. FIG. 1 shows the detonation arrestor 158 positioned downstream of the pressure relief valve 138. The system may also include a plurality of measurement devices 160, 170, 174 and 178 coupled to alarms 162, 172, 176 and 180, respectively. For example, a temperature transducer 160 may monitor temperature downstream of detonation arrester 158. A third vacuum relief valve 164 may also be provided downstream of the detonation arrestor. A flow meter may also be provided to measure an amount of fluid that passes through (or to) the pressure relief valve 138. In this or other flow meters, micro motion meters may be used to specifically detect vapor. Vapor measurements may also be taken. For example, the measurement device 170 may comprise a vapor level monitor capable of detecting vapor from 1-300 parts per million (ppm) leaving the first adsorption bed 150. Similarly, the measurement device 174 may also comprise a vapor level monitor. The one or more vapor level monitors may either verify the system is operating properly or may warn or initiate an action when a vapor adsorption bed needs replacement or when the system needs to be shut down. It should be recognized that measurements may be taken at other points as well, and additional measurement devices may also be provided. Additionally, the measurement device 178 may also comprise a temperature transducer. A check valve 182 may also be provided to prevent any reverse flow. Additional valves and/or piping structures may also be provided, for example to block or create bypass lines around various devices, structures or parts of the system. Example configurations are illustrated in FIG. 1.

In one example, if and when the pressure of the vapor as measured by the pressure measurement device reaches about 0.75 (or some other predetermined level, such as about 1 psi) or the pressure relief valve 138 is otherwise triggered to be opened, then a certain amount of vapor passes through the pressure relief valve 138 in the direction of at least one adsorption device 150 (although more may be provided, such as a primary and a secondary adsorption device, 150 and 152 respectively). Removing the vapor at that point in the piping ensures that vapor is redirected, and does not otherwise escape. For example, the vapor may first pass to the primary adsorption device 150 which may include adsorption media such as an activated carbon bed. A volumetric measurement device and/or a pressure measurement device (see, e.g., FIGS. 2, 142 and 144) can also be positioned between the pressure relief valve and the primary adsorption device. The vapor may be directed to one of the vapor adsorption device (e.g., a Siemens Vent-Scrub), where the vapor is adsorbed onto the adsorption media. A determination should be made when the primary adsorption device 150 has reached a level of saturation that merits replacement. Although other ways of monitoring the saturation level of the adsorption unit are contemplated, one approach is to make that determination inferentially, by relying on the volumetric measurement device positioned upstream of the adsorption unit. Once a predetermined volume of vapor has flowed through the pressure relief valve 138, and into the adsorption unit, then a conclusion is reached, or determination made, that the adsorption unit has reached a saturation level that merits replacement.

In at least one specific embodiment, the emission control and monitoring system is then operated to shut down (deactivate) some or all of the trans-loading operations while the primary unit 150 is isolated, removed and replaced with the secondary, or backup unit 152, which then becomes the new primary unit. However, in another specific embodiment, the switch to the secondary unit 152 can be performed without shutting down the trans-loading operation. In that alternative specific embodiment, once the primary unit has reached the desired level of saturation, a valve 156 in the piping leading to the secondary unit 152 is opened, so that the vapor is permitted to flow to the secondary unit 152. After the secondary unit valve 156 is fully opened, then the valve 154 permitting vapor to flow to the primary unit 150 is closed, so that no vapor passes to the primary unit 150, and the secondary unit 152 becomes operational. While the secondary unit 152 is operated, the primary unit 150 can be disconnected and taken off-site to be refreshed. Alternatively, the primary unit 150 can remain in place, but the activated carbon in that unit can be replaced or otherwise refreshed. Then, later, when the secondary unit 152 becomes saturated, the same steps are taken to re-direct the vapors from the secondary unit 152 to the primary unit 150 once again.

Figure 2:
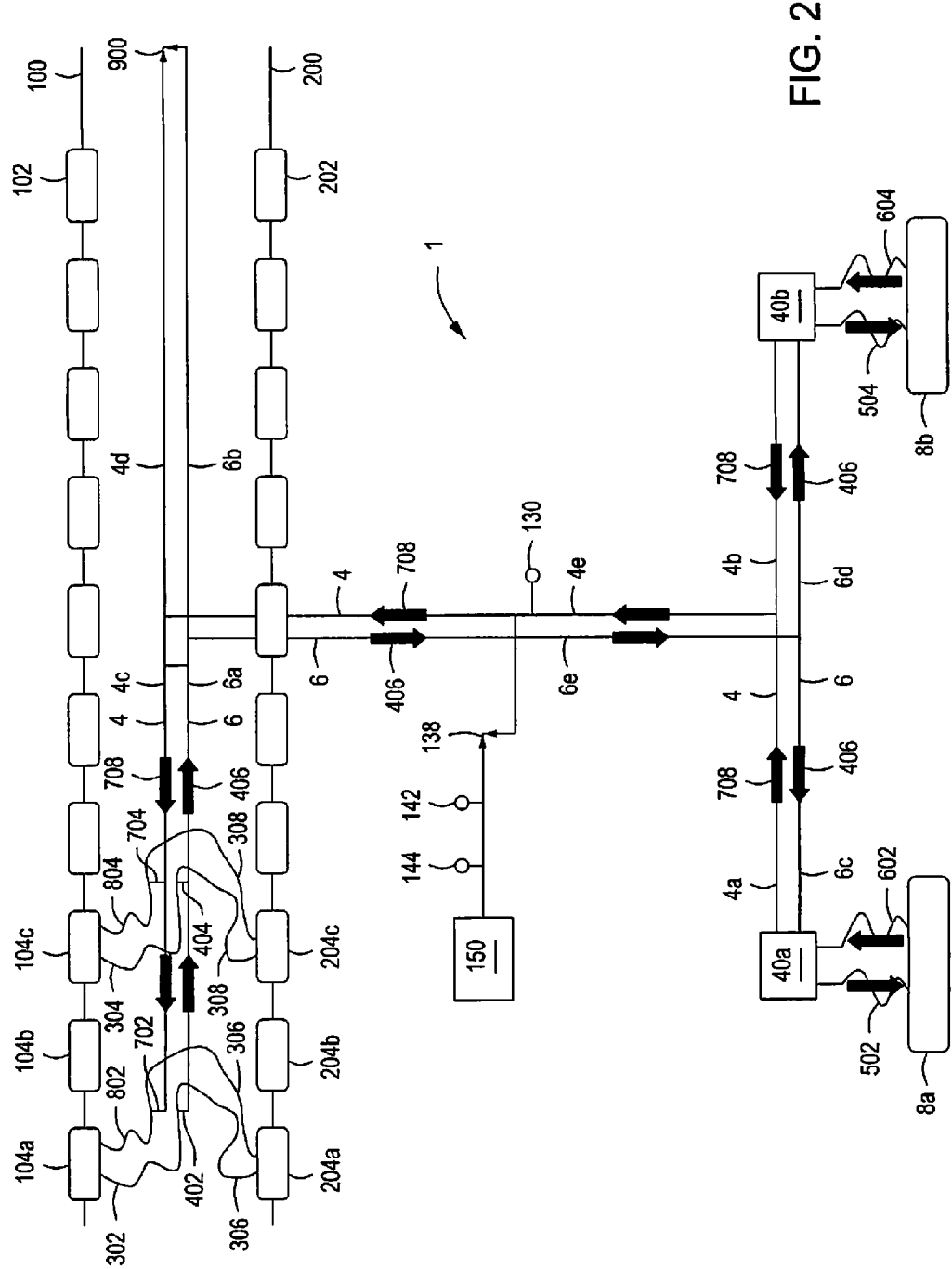
FIG. 2 is a schematic illustration of a vapor control system with capability of unloading or loading a plurality of vessels.

Turning to FIG. 2, an embodiment is illustrated for a vapor control system 1 capable of processing more than one railcar and/or more than one truck. In FIG. 2, liquid conduit 6 comprises an ethanol header capable of receiving ethanol from a plurality of unloading vessels (in this case, railcars 104*a, b, c*, etc. and 204*a, b, c*, etc.) and providing ethanol to a plurality of loading vessels (in this case, trucks 8*a* and 8*b*). It is to be understood that more or less vessels could be provided, and FIG. 2 is an illustration. In FIG. 2, facilities may be provided for receiving a plurality of trains. A first railroad track 100 may receive a first train 102 comprising multiple railcars 104*a, b, c*, etc. A second railroad track 200 may receive a second train 202 comprising multiple railcars 204*a, b, c*, etc.

In a further embodiment, a first liquid unloading hose 302 may be used to connect a first railcar 104*a* to a first receiving station 402 coupled to the liquid conduit 6, such that liquid ethanol may be transferred from the railcar 104*a* to the liquid conduit 6. A second liquid unloading hose 304 may be used to connect another railcar (in this illustration, 104*c*) to a second receiving station 404 coupled to the liquid conduit 6. Additionally, a third liquid unloading hose 306 may be provided to connect a railcar 204*a* from the second train 202 to the liquid conduit 6. FIG. 2 illustrates an embodiment in which the first receiving station 402 is capable of receiving ethanol from more than one source, in this case, the first and third liquid unloading hoses, 302 and 306. In a further embodiment, a fourth liquid unloading hose 308 may be provided to connect a railcar 204*c* from the second train 202 to the second receiving station 404. The liquid unloading hoses may comprise three-inch hoses with dry break connectors. As shown, the facilities and system illustrated in FIG. 2 allow for more than one railcar (or more than one train) to be received and or processed at the facilities, thus improving efficiency and capacity.

Arrows 406 illustrate the flow path of ethanol in the liquid conduit 6. As shown, liquid ethanol is transported through liquid conduit 6 from the railcars. The liquid conduit 6 may comprise more than one receiving branch 6*a* and 6*b* for receiving ethanol. The liquid conduit 6 may also comprise more than one delivery branch 6*c* and 6*d* for delivering ethanol to one or more trucks. Alternatively, an operator may also select which of the branches to use, for example, by opening or closing valves as appropriate. The liquid conduit 6 may further comprise a main liquid line 6*e* that receives ethanol from one or more of the receiving branches and delivers ethanol to one or more of the delivery branches. In FIG. 2, an embodiment is illustrated in which liquid ethanol is provided in both delivery branch 6*c* and 6*d* of the liquid conduit 6. As shown, liquid ethanol flows through delivery branch 6*c* to a pump skid 40*a*. As discussed previously in reference to FIG. 1, the pump skid 40*a* may house a pump 34*a* (not shown). Similarly, liquid ethanol is also provided through delivery branch 6*d* to pump skid 40*b*. A first liquid loading hose 502 may be placed in fluid communication with the delivery branch 6*c* and connected to the first truck 8*a*. A second liquid loading hose 504 may be placed in fluid communication with the delivery branch 6*d* and connected to the second truck 8*b*. The liquid losing hoses may comprise three-inch hoses with dry break connectors. As shown, the facilities and system illustrated in FIG. 2 allow for more than one truck to receive ethanol. This provides enhanced operating efficiency. For example, an operator may be able to work on the second truck 8*b*, while waiting for the first truck 8*a* to fill, and while the monitoring and pressure protection systems provide improved certainty and protection.

FIG. 2 also illustrates another embodiment for vapor control. A vapor conduit 4 may be provided, capable of transferring vapor from the trucks 8*a* and 8*b* to one or more railcars. The vapor conduit 4 may have more than one vapor receiving branches (in this illustration, 4*a* and 4*b*) for receiving vapors. The vapor conduit 4 may also have more than one vapor delivery branches (4*c* and 4*d*) for delivering vapors to one or more railcars. The vapor conduit 4 may further comprise a main vapor line 4*e* that receives vapors from one or more of the receiving branches and delivers vapors to one or more of the delivery branches. Alternatively, an operator may also select which of the branches to use, for example, by opening or closing valves as appropriate.

In the embodiments shown in FIG. 2, a first vapor loading hose 602 may be used to connect a portion of the truck 8*a* (capable of being in fluid communication with a vapor phase in truck 8*a*) to the vapor conduit 4. Arrows 708 illustrate the flow path of vapors. For example, as truck 8*a* is loaded with ethanol, vapor may exit through the first vapor loading hose 602. Pump skid 40*a* may also house structures for vapor loading hose 602 to connect to vapor receiving branch 4*a*. Similarly, truck 8*b* may be connected by a second vapor loading hose 604 to the second vapor receiving branch 4*b*. FIG. 2 illustrates vapors transported through the vapor conduit 4 to vapor delivery branch 4*c* and to one or more railcars. A first railcar 104*a* may be connected by a first vapor delivery hose 802 to a first vapor delivery station 702 coupled to the vapor delivery branch 4*c*. A second vapor delivery station 704 may be connected to a second vapor delivery hose 804, which may be connected to another railcar, in this case railcar 104*c* from the first train 102. In the embodiment shown, the first and second vapor delivery stations 702 and 704 are each capable of connecting to more than one vapor delivery hose. As shown, the first vapor delivery station 702 may also be connected by a third vapor delivery hose 806 to another railcar, in this case railcar 204*a* from the second train 202. The second vapor delivery station 704 may also be connected by a fourth vapor delivery hose 808 to another railcar 204*c*. The vapor hoses may be three-inch hoses with dry break connectors designed for vapor applications. In a further embodiment, when railcar 104*a* finishes delivering liquid ethanol, the associated liquid and vapor hoses may be switched to railcar 104*b* without having to move the train 102 further down the track— or with minimal movement.

The system illustrated in FIG. 2 also provides for pressure protection and monitoring. A first measurement device 130 may be provided in the main vapor line 4*e*, which may comprise a pressure transducer. In the embodiment shown, a pressure relief valve 138 is provided in fluid communication with the main line 4*e*. Downstream of the pressure relief valve 138, a second measurement device 142 may be provided, capable of determining if any fluid flow has passed the pressure relief valve. In another embodiment, the second measurement device 142 provides a volumetric flow measurement. Also downstream of the pressure relief valve 138, a third measurement device 144 may be provided, which may comprise a pressure measurement. An adsorption bed 150 may also be provided to capture vapors that pass through the pressure relief valve 138. Additional pressure relief valves may also be provided to open flow paths up for other parts of the system 1. In this way, pressures may be controlled at different values for different parts of the system 1. For example, a pressure relief valve (not shown) may be included to regulate vapor flow from the truck 8*a*. In another embodiment, vapors are taken from the truck whenever the pressure in the truck 8*a* rises to about 1 psi or above. The pressure relief valve 138 in the main vapor line 4*e* may be set to open at a different value. And a pressure relief valve (not shown) may be included on one or more of the railcars. In a further embodiment, excess pressure in a railcar may be relieved by routing vapor from the railcar back to the vapor conduit 4. For example, a railcar holding ethanol may experience a rise in pressure, such as by heating from the sun before it is unloaded. If pressure rises above a certain amount, the pressure relief valve could send vapors to the vapor conduit 4 or to another desired location. As a further example, pressure relief valve 138 may be set to open at about 0.70 psi, the pressure relief valve on the truck may be set to about 1 psi, and the pressure relief on the one or more railcars may be set to about 0.75 psi. Additionally, a vacuum relief valve may be provided in the vapor conduit 4. In another embodiment, an additional valve arrangement 900 may be provided. The valve arrangement 900 may comprise a pressure relief valve to open up a flow path for pressure relief. For example, valve 900 may be set for one inch of water column, and may open up a flow path from one part of the system to another. Alternatively or in addition, vacuum relief may be provided at valve arrangement 900.

Figure 3:
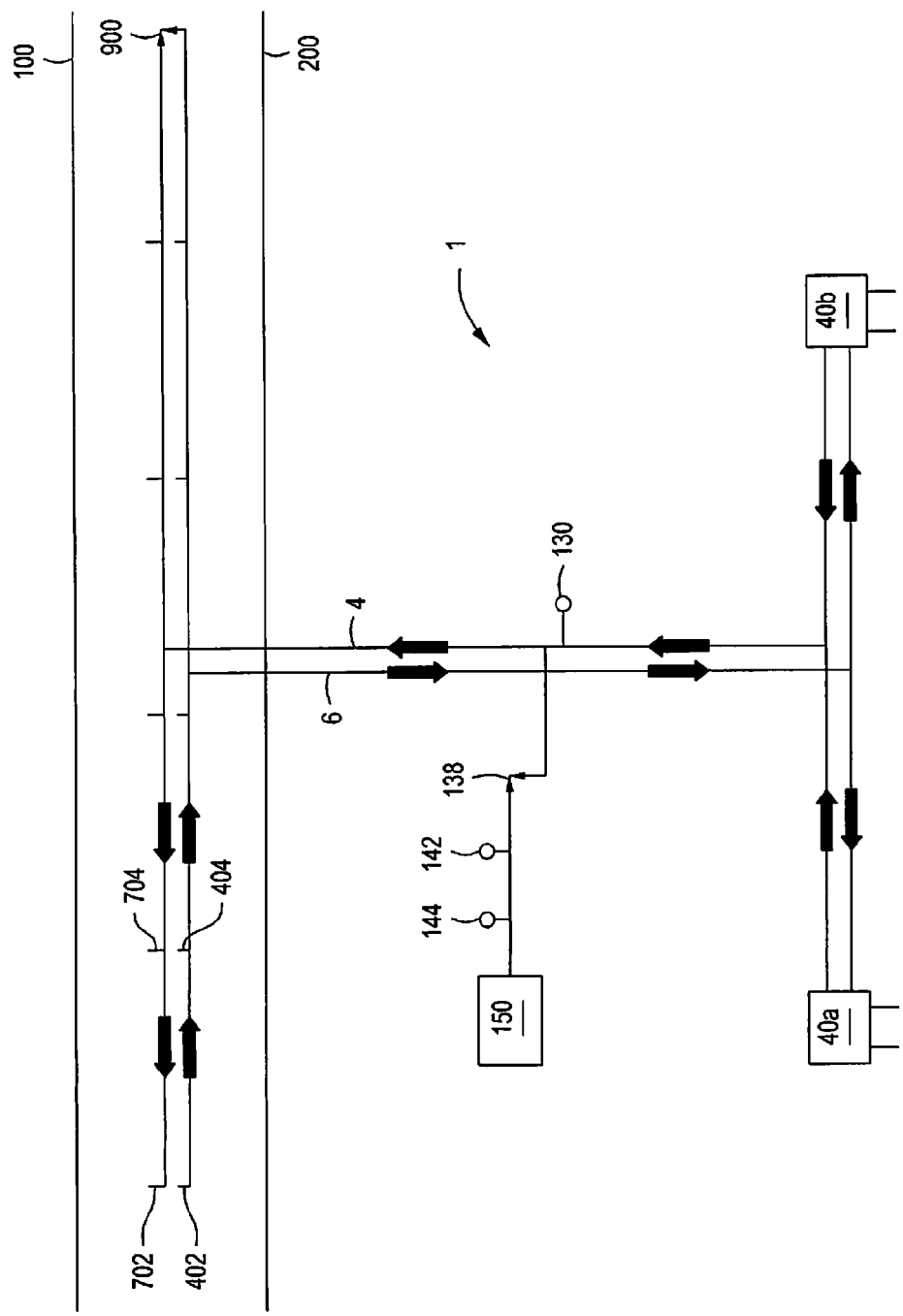
FIG. 3 is a schematic illustrating a vapor control system in a non-loading or an idle state.

FIG. 3 illustrates an embodiment of a vapor control system 1 in its non-loading or idle state with facilities for receiving a plurality of railcars and trucks. In the embodiment shown, pressure protections remain in place during the time that the system or facility is not unloading or loading ethanol. The pressure relief valve 138 may remain set to open at a selected value, or may be adjusted to another value for the specific situation. The measurement device 130 may continue to monitor pressure in at least a portion of the vapor conduit 4. And monitoring features for any flow that passes the pressure relief valve 138 may remain in place. FIG. 3 illustrates a volumetric measurement device 142 and a pressure measurement device 144 upstream of at least one adsorption bed 150. Activated carbon may be used in the adsorption bed 150. The pressure relief valve 138 may be set at about 0.70 psi.

If, during non-transload operations, residual vapors in the vapor conduit 4 build pressure when the ambient temperature rises, then the system maintains capabilities of relieving pressure while controlling or capturing vapors, even in the absence of the railcars. Any release may also be controlled and measured. Pressure relief valve 900 may also remain operable. Also, in the embodiment shown in FIG. 3, the vapor and liquid hoses are detached. As shown in FIG. 3, the pressure protection and/or the monitoring features may also provide protection for conduction operations on the vapor control system when unloading or loading vessels are not connected or when transload operations are not being conducted. For example, it may be desirable to remove or purge liquid or vapors from at least desired portions of the system, such as to conduct maintenance, remove corrosives, protect against leaks, prepare for shutdown, or to flush the system with a purge gas. The features discussed herein facilitate such operations while continuing to provide protection, for example by draining and vapor balancing, pressure protection and/or monitoring. In a further embodiment, a purge gas (such as nitrogen or air if appropriate) may be provided to flow through various components of the system and be routed to the activated carbon beds to capture emissions. Bypass lines and valve arrangements may also be used as appropriate.

Figure 8:
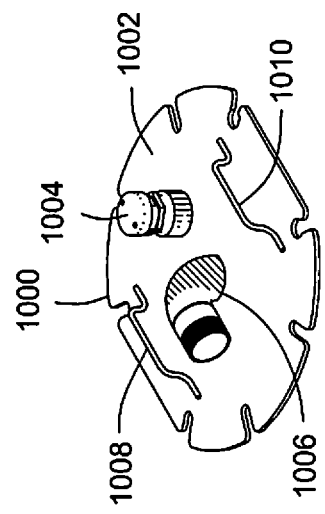
FIG. 8 is a perspective view of a manway cover.
Figure 7:
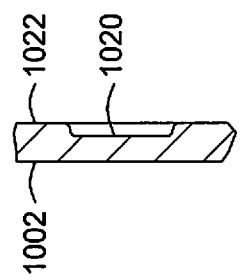
FIG. 7 is a cut out view of a portion of a manway cover.

In further embodiments, a port cover may be provided. The port cover may be configured to fasten down on a vessel port to inhibit vapor from exiting the vessel. A vacuum breaker may be coupled to the port cover to allow air to enter the vessel when the vacuum breaker opens. FIGS. 4-8 illustrate embodiments of a port cover comprising a manway lid (or portions of a manway) that may be used on a railcar. Covers or manways may also be used on a truck as well. FIG. 8 illustrates a perspective view of a manway cover 1000 according to some embodiments. FIG. 4 illustrates a top view of the manway cover 1000, and FIG. 6 illustrates a side view of the manway cover 1000, viewed from along a center line 6 illustrated in FIG. 4. FIG. 5 illustrates a side view of a portion of the manway cover 1000 as viewed from along line 5 in FIG. 4. FIG. 7 illustrated a cutout view of a portion of the dome lid 2002 from the section in FIG. 6 circumscribed by curved arrow 7.

The manway cover 1000 illustrated in FIGS. 4, 6 and 8 comprises a dome lid 2002 with a vacuum breaker 1004 and a connection port 1006. Handlebars 1008 and 1010 are also provided, which may be arranged parallel to the center line 6 (shown in FIG. 4) for balance and stability. The dome lid 1002 may be designed to fasten down on a manway (or other vessel port). To provide fastening pressure, a series of grooves 1012 *a-h* may be provided through the dome lid 1002. Each groove may be positioned along a circumference 1022, such that the grooves may receive bolts (not shown) to fasten the dome lid 1002 to the vessel, and to increase pressure to avoid leaks. Further, gasket material may be used between the dome lid 1002 and the vessel to further reduce the possibility of leaks. FIGS. 6 and 7 illustrate an embodiment in which dome lid 1002 has a gasket groove 1020 along a bottom surface 1022 of the dome lid 1002 suitable for placement of a gasket. The gasket groove 1020 may be circular and the gasket may be an o-ring.

The connection port 1006 may comprise a portion of curved conduit 1014 coupled to a connection end 1016. The curved conduit 1014 and the connection end 1016 may be fabricated as a single piece. The curved conduit portion 1014 may provide a fluid path that turns at a right angle with respect to the dome lid 1002. The connection end 1016 may comprise a threaded portion 1016 *b* and an unthreaded portion 1016 *a*. One or more valves may be provided that couple to the connection end 1016, or the connection end 1016 may be capable of connecting to dry break connectors.

The vacuum breaker 1004 may allow ambient air to enter the vessel through the manway cover 1000 if pressure in the vessel drops to below a certain level or if a vacuum is created in the vessel. Accordingly, safety protection is provided against implosions, and leak points may be prevented or reduced in the manway cover 1000.

While the foregoing is directed to embodiments of the present invention, other and further embodiments of the invention may be devised without departing from the basic scope thereof, and the scope thereof is determined by the claims that follow.

What is claimed as an invention herein is:

1. A method of transferring a volatile organic liquid between a railcar and a truck, comprising:

providing a first vessel coupled to or part of a railcar containing a volatile organic liquid, a second vessel coupled to or part of a truck and configured to receive a volatile organic liquid, and a facility that has at least a first conduit, a second conduit, a pressure relief valve in fluid communication with the second conduit, a pump in fluid communication with the first conduit, a first adsorption bed, and a second adsorption bed, wherein either the first or the second adsorption beds, or both, are in fluid communication with the pressure relief valve, and wherein the first adsorption bed is configured to be capable of receiving vapors from the pressure relief valve while the second adsorption bed is prevented from receiving vapors from the pressure relief valve and the second adsorption bed is configured to be capable of receiving vapors from the pressure relief valve while the first adsorption bed is prevented from receiving vapors from the pressure relief valve;

providing flow of volatile organic liquid from the first vessel through the pump and the first conduit to the second vessel; and providing flow of organic vapor into the first vessel, wherein organic vapor flows from the second vessel, through the second conduit, and into the first vessel, and wherein the pressure relief valve is capable of opening such that organic vapor in the second conduit may pass through the pressure relief valve and flow to the first adsorption bed; and wherein the pump causes at least some volatile organic liquid to flow from the first vessel to the second vessel.

2. A method of transferring a volatile organic liquid between a railcar and a truck, comprising:

providing a first vessel coupled to or part of a truck containing a volatile organic liquid, a second vessel coupled to or part of a railcar and configured to receive a volatile organic liquid, and a facility that has at least a first conduit, a second conduit, a pressure relief valve in fluid communication with the second conduit, a pump in fluid communication with the first conduit, a first adsorption bed, and a second adsorption bed, wherein either the first or the second adsorption beds, or both, are in fluid communication with the pressure relief valve, and wherein the first adsorption bed is configured to be capable of receiving vapors from the pressure relief valve while the second adsorption bed is prevented from receiving vapors from the pressure relief valve and the second adsorption bed is configured to be capable of receiving vapors from the pressure relief valve while the first adsorption bed is prevented from receiving vapors from the pressure relief valve;

providing flow of volatile organic liquid from the first vessel through the pump and the first conduit to the second vessel; and providing flow of organic vapor into the first vessel, wherein organic vapor flows from the second vessel, through the second conduit, and into the first vessel, and wherein the pressure relief valve is capable of opening such that organic vapor in the second conduit may pass through the pressure relief valve and flow to the first adsorption bed; and wherein the pump causes at least some volatile organic liquid to flow from the first vessel to the second vessel.

\* \* \* \* \*